(12) United States Patent
Schieferdecker et al.

(10) Patent No.: US 11,268,861 B2
(45) Date of Patent: Mar. 8, 2022

(54) SMD-ENABLED INFRARED THERMOPILE SENSOR

(71) Applicant: Heimann Sensor GmbH, Dresden (DE)

(72) Inventors: Jörg Schieferdecker, Dresden (DE); Frank Herrmann, Dohna (DE); Christian Schmidt, Dresden (DE); Wilhelm Leneke, Taunusstein (DE); Marion Simon, Bad Schwalbach (DE); Karlheinz Storck, Lorch am Rhein (DE); Mischa Schulze, Hünstetten (DE)

(73) Assignee: Heimann Sensor GmbH, Dresden (DE)

( * ) Notice: Subject to any disclaimer, the term of this patent is extended or adjusted under 35 U.S.C. 154(b) by 47 days.

(21) Appl. No.: 16/474,798

(22) PCT Filed: Dec. 22, 2017

(86) PCT No.: PCT/EP2017/084306
§ 371 (c)(1),
(2) Date: Jun. 28, 2019

(87) PCT Pub. No.: WO2018/122148
PCT Pub. Date: Jul. 5, 2018

(65) Prior Publication Data
US 2019/0316967 A1    Oct. 17, 2019

(30) Foreign Application Priority Data

Dec. 30, 2016    (DE) .................... 10 2016 125 943.8

(51) Int. Cl.
*G01J 5/12*    (2006.01)
*G01J 5/02*    (2006.01)
(Continued)

(52) U.S. Cl.
CPC .................. *G01J 5/12* (2013.01); *G01J 5/023* (2013.01); *G01J 5/045* (2013.01); *G01J 5/0853* (2013.01)

(58) Field of Classification Search
None
See application file for complete search history.

(56) References Cited

U.S. PATENT DOCUMENTS 8,592,765 B2    11/2013    Forg et al.
2003/0118076 A1    6/2003    Schieferdecker et al.
(Continued)

FOREIGN PATENT DOCUMENTS

CN    101563591 B    9/2013
CN    103342332 A    10/2013
(Continued)

OTHER PUBLICATIONS

The Korean Intellectual Property Office, Notice of Allowance in related Korean Patent Application 10-2019-7021979, dated Nov. 30, 2021.

*Primary Examiner* — David P Porta
*Assistant Examiner* — Carolyn Fin
(74) *Attorney, Agent, or Firm* — Smartpat PLC

(57) ABSTRACT

An SMD-enabled infrared thermopile sensor has at least one miniaturized thermopile pixel on a monolithically integrated sensor chip accommodated in a hermetically sealed housing which consists of an at least partially non-metallic housing substrate and a housing cover. A gas or a gas mixture is contained in the housing. The sensor has a particularly low overall height, in particular in the z direction. This is achieved by virtue of an aperture opening being introduced in the housing cover opposite the thermopile pixel(s), which aperture opening is closed with a focusing lens which focuses the radiation from objects onto the thermopile pixel(s) on the housing substrate, and by virtue of a signal (Continued)

processing unit being integrated on the same sensor chip next to the thermopile pixels, wherein the total housing height and the housing cover are at most 3 mm or less than 2.5 mm.

15 Claims, 5 Drawing Sheets

(51) Int. Cl.
  *G01J 5/04* (2006.01)
  *G01J 5/08* (2006.01)

(56) References Cited

U.S. PATENT DOCUMENTS

| | | |
|---|---|---|
| 2007/0138395 A1 | 6/2007 | Lane et al. |
| 2011/0174978 A1 | 7/2011 | Forg et al. |
| 2014/0041214 A1 | 2/2014 | Barlow |
| 2014/0117201 A1 | 5/2014 | Barlow |
| 2014/0291527 A1 | 10/2014 | Okudo et al. |
| 2015/0177070 A1 | 6/2015 | Maes et al. |
| 2015/0253194 A1 | 9/2015 | Buggenhout |
| 2015/0308899 A1 | 10/2015 | Buydens et al. |
| 2015/0369669 A1 | 12/2015 | Kassovski et al. |
| 2016/0149105 A1 | 5/2016 | Buggenhout et al. |
| 2016/0169738 A1 | 6/2016 | Wiel |
| 2016/0305829 A1 | 10/2016 | Emadi et al. |
| 2018/0113024 A1 | 4/2018 | Hirose et al. |

FOREIGN PATENT DOCUMENTS

| | | |
|---|---|---|
| DE | 10321640 | 12/2016 |
| EP | 1296122 B1 | 1/2007 |
| EP | 2887033 A1 | 6/2015 |
| EP | 2916118 A1 | 9/2015 |
| EP | 2940442 A1 | 11/2015 |
| EP | 2975371 A1 | 1/2016 |
| EP | 3035015 B1 | 4/2017 |
| EP | 3026406 B1 | 1/2018 |
| JP | 2011174763 A | 9/2011 |
| JP | 2012220419 A | 11/2012 |
| JP | 2016502071 A | 1/2016 |
| KR | 101661920 B1 | 10/2016 |
| KR | 1020180016895 A | 2/2018 |
| WO | 2004102139 A1 | 11/2004 |
| WO | 2016175089 A1 | 11/2016 |

SMD-ENABLED INFRARED THERMOPILE SENSOR

TECHNICAL FIELD

The invention relates to an SMD-enabled thermopile infrared sensor for contactless temperature measurement, as a hotspot or for gesture detection, having at least one miniaturized thermopile pixel on a monolithic integrated sensor chip, which is housed in a hermetically sealed housing, consisting of an at least partially nonmetallic housing substrate and a housing cover, wherein a gas or gas mixture is located in the housing.

BACKGROUND

Contactless temperature measurement, gesture control, or the detection of hot and cold objects is increasingly becoming of interest for mobile devices such as smart phones, smart pads, or other small portable devices. In this case, because of the small amount of space available or because of the increasingly lower device thickness, particularly small dimensions of SMD components to be mounted are important. Because more remote or spatially delimited measured objects are also to be captured, a small viewing angle is required for the sensor or sensors.

The infrared sensor also has to be "calibrated" already before the mounting in one of the mentioned devices, i.e., enable the output of a reproducible object temperature. One preferred area of application is, for example, using the smart phone for contactless fever measurement, which in turn requires a very high measuring accuracy.

Typical requirements for the dimensions of the housings for smart phones are in particular that the z axis (i.e., in the measuring direction) is at most 3 mm and preferably only 2 mm, so that the infrared sensor can be arranged, for example, adjacent to a CMOS camera on the circuit board or in extremely constricted space on the end face of the smart phone. In addition, the lateral dimensions in the x and y directions of the infrared sensor are also to be less than 5 mm, preferably also less than 3-4 mm at least in one axis.

A large number of thermal infrared sensors which are produced in silicon micromechanics technology are known, for example, pyroelectric sensors, bolometers, and thermopiles. To achieve a high level of absolute accuracy in the temperature measurement, pyroelectric sensors require a modulator (chopper). Bolometers also require the offset compensation by a mechanical shutter at least temporarily to achieve a high accuracy.

Both choppers and also shutters, as mechanical moving parts of the sensor, require a sufficient reliability over the lifetime of the device and have to be installed in the optical channel of the IR sensor (i.e., in front of the sensor in the viewing direction). The dimension in the "z direction" would thus increase by approximately 1 mm, since the chopper or shutter has to be installed into the optical channel. Since a focusing optical unit, the sensor chip, and the housing also require space in addition to the additional chopper/shutter assembly, it is not possible in the present prior art to construct such a small IR sensor having <3 mm or even <2 mm z axis (so-called optical track) using pyroelectric sensors or bolometer sensors.

Without choppers/shutters, the required measurement accuracy, in particular for fever measurements, is not achievable using bolometers or pyroelectric sensors. However, even without installed shutter, the smallest presently known infrared array sensor on a bolometer basis having installed optical unit and signal processing for temperature measurement, the "Lepton" of FLIR Systems, has a housing height of 5.9 mm (see datasheet "FLIR Lepton", FLIR Systems, Goleta, Calif., USA). This is very far from the permissible housing sizes for modern smart phones. Therefore, in the present prior art, pyroelectric sensors and bolometers are excluded from use in modern, slender smart phones.

Thermopile infrared sensors are also used in large piece counts for consumer measuring devices having high accuracy (for example, fever thermometers). In this case, a transistor housing (TO housing) is typically used. The smallest TO sensors for such measuring purposes have a housing height of approximately 3 mm, however, they do not have a focusing optical unit, which results in a viewing angle of greater than 100°, which is much too large, and any type of signal processing is also absent (see datasheet 10TP583T-0154, datasheet of Semitek Ishizuka Electronics, Japan).

A thermopile sensor having focusing optical unit is known from Heimann Sensor, which is also housed in a TO housing. The type HMS M21 L3.0 F5.5 (see datasheet Heimann Sensor GmbH, Dresden 2012) enables limiting of the viewing angle to <30°, but the housing height of 5.2 mm is much too tall for use in mobile devices, moreover signal processing for temperature measurements is absent.

All mentioned thermopile solutions in the TO housing also share the feature that the terminals by means of wire pins on the lower side of the housing make mounting on a circuit board impossible. A surface mounting capability on circuit boards (SMD ability) is required, however.

Further solutions for miniaturized thermopile sensors are disclosed in the following documents:

For example, a thermopile sensor chip is described in EP 1 296 122 B1, which, with vertical walls, has the largest possible membrane to maximize the measurement signal. Suggestions for miniaturization of the housing shape, the SMD ability, and to restrict the aperture angle are absent.

A further sensor for contactless measuring of a temperature is disclosed in U.S. Pat. No. 8,592,765 B2, by a thermopile sensor pixel having a thin membrane being described, wherein integrated signal processing, which is not described in greater detail, is also mentioned. However, there are no indications of an SMD ability or even with respect to very small dimensions in the direction of the optical axis (z axis), because the illustrated housing types are entirely large wired TO housing forms.

An SMD-enabled thermopile is presented in DE 103 21 640 B2, which does not permit a small structural form and also does not propose monolithic integration of the signal processing, however. A focusing lens optical unit is also absent, which permits a small viewing angle for pixels with small structural height, but even without focusing lens optical unit, a structural height of greater than 3 mm results here.

Furthermore, thermopile pixels in a wafer-level package are proposed in EP 2 887 033 A1 and EP 2 916 118 A1, which are provided with an aperture in front of the thermopile pixel. However, a focusing lens and an SMD-enabled solution, using which the required small dimensions are achieved in the z axis, are absent.

EP 2 940 442 A1 relates to a wafer-level package for a thermopile pixel, which is constructed in the flip chip method and wherein a perforated screen or aperture screen is located in front of the sensor pixel. However, there are no indications of an SMD ability and a focusing optical unit. Such perforated screens have the disadvantage in contrast to focusing lens optical units, however, that the signal decreases with the square of the f-number D/f, wherein D is the diameter of the perforated screen or aperture screen and f is the focal length or the distance between perforated screen or aperture screen and the sensitive absorber surface.

This effect may be estimated well on the basis of the example of a viewing angle of 15°, wherein a focusing lens can even reach f-numbers D/f greater than one and D/f=1 is a typical f-number for single-lens IR optical units (F/1 optical unit). The signal reaching the sensor pixel is identical to the square of the f-number. A perforated screen optical unit having a viewing angle of 15° would reduce the signal by approximately 14-fold in comparison to a focusing lens optical unit, which significantly worsens the resolution and the measuring accuracy of such a sensor having perforated screen optical unit.

An infrared sensor having temperature compensation in a wafer-level package solution is presented in EP 2 975 371 A1, in which one or two sensor pixels are housed in a wafer housing and in which pixels can have a different number of thermocouples switched on or switched off via switches to calibrate the thermopile.

Furthermore, a sensor pixel housed in a wafer-level package with compensation pixel located adjacent and a cavity above and below each of the pixels is also specified in EP 3 026 406 A1. Apparently an internal layer is applied in the cavity above the compensation pixel, which has either a reflective or absorbing effect and does not let in radiation from the outside, which does reach the pixel located adjacent, however.

No option is given here either for surface mounting ability, nor a focusing lens for a small viewing angle of the pixel, nor a signal processing unit.

A wafer-level package housing having two pixels is also presented in EP 3 035 015 A1, in which a pixel is shielded from external radiation by an infrared-blocking layer located on the wafer edge lying above it, wherein in addition heating coils are connected to both pixels to bring the pixels to another temperature if needed.

All of these solutions share the feature that one or more measuring pixels are provided, wherein a focusing optical unit is not provided, however, to enable a small viewing angle for temperature measurement of more remote objects for the sensor in spite of low structural height, or the achievable signals would be attenuated in such a way that the measuring task cannot be fulfilled.

Possibilities for surface mounting ability (SMD) are not specified in any of the described solutions from the prior art, except in DE 103 21 640 B2, and there are no indications of a signal processing unit, which computes temperature values, for example.

SUMMARY

The problem on which the invention is based is to specify a miniaturized surface-mounting enabled thermopile infrared sensor for contactless temperature measurement, as a hotspot or for gesture detection, and having integrated signal processing, which has a sufficiently low structural height in the z direction in particular to be able to be installed without problems in mobile devices, such as smart phones.

The problem on which the invention is based is solved in an SMD-enabled thermopile infrared sensor of the type mentioned at the outset in that an aperture opening is introduced into the housing cover opposite to the thermopile pixel or pixels, which is hermetically sealed using a focusing lens, which focuses the radiation of objects onto the thermopile pixel or pixels on the housing substrate, a signal processing unit is integrated on the same sensor chip adjacent to the thermopile pixels, and wherein the total housing height of housing substrate and housing cover is at most 3 mm or less than 2.5 mm.

A gas or gas mixture is enclosed in the hermetically sealed housing, consisting of housing substrate and housing cover, which gas or gas mixture has a high molar mass, such as xenon, krypton, or argon, and has a thermal conductivity which is significantly less than that of air or nitrogen, and wherein the gas or gas mixture has a significantly reduced internal pressure in relation to normal air pressure.

The focusing lens images object radiation on the thermopile pixel or pixels from a viewing angle (field of view=FOV) of at most 40° or at most 15°.

To enable electrical and mechanical contacting, the housing substrate has metallic connections from the front side to the rear side (bottom surface), which are provided on the rear side with contact surfaces having a surface which can be soldered or welded.

Furthermore, the housing cover consists of a metal or nonmetal having high thermal conductivity, for example, >80 V/(W*K) and is designed as a deep-drawn, injection-molded, or diecast part.

The housing cover and the housing substrate are preferably bonded to one another via an adhesive, soldered, or welded bond, wherein an insulation layer is located above the metallic connections and a metal layer is located thereon.

In one particular refinement of the invention, a reference pixel, which receives infrared radiation from the housing cover located above it, is arranged in the sensor chip adjacent to the thermopixel arranged below the focusing lens and the housing cover has an absorbing layer or another type of cover on the inner side in the region above the reference pixel.

To achieve a particularly low structural form, the housing cover has, in the region of the focusing lens on the inner side, a bulge shaped according to the outer shape of the focusing lens or an indentation adjoining an elevation of the cover for fixing the focusing lens in its position above the thermopixel.

In a further design of the invention, the distance of the housing cover in the region of the focusing lens from the thermopixel is significantly greater than the distance in the region of the absorbing layer from the reference pixel.

In a refinement of the invention, multiple sensor pixels are arranged in two-dimensional form, for example, a matrix form, under the focusing lens, the output signals of which can be used for measuring temperature distributions or for gesture recognition.

The size of the thermopixels and/or the sensor pixels is preferably between less than 300 µm and at most 500 µm and the length or width of the housing substrate is between at most 3 mm and 5 mm, so that care is taken with the restricted space conditions in a smart phone.

Furthermore, the focusing lens can be diffractive or refractive and can have either aspheric or spheric surfaces.

The focusing lens preferably has a focal length between 0.5 mm and 1.9 mm.

Finally, the thickness of the bottom surface of the housing substrate and the thickness of the housing cover are between less than 0.3 mm and at most 0.5 mm.

In a further refinement of the invention, the signal processing unit comprises the storage of the calibration data for the thermopixels and/or the sensor pixels and the computation of the object temperature and the storage of the measured values.

The signal processing unit preferably furthermore comprises measuring units for temperature and voltage references and also the operating voltage and furthermore signal amplifiers, low-pass filters, analog-to-digital converters, a microprocessor unit having data memory, such as an EEPROM, and an interface for communication with the external electronics of a mobile device, such as a smart phone.

The thermopile infrared sensor according to the invention is characterized by a particularly small structural form, in particular in the optical axis, and represents an SMD-enabled construction, wherein at least one sensor pixel has a surface area of <0.5 mm, preferably <0.3 mm.

Furthermore, the housing substrate is provided with an integrated focusing lens to focus only infrared radiation from a small viewing angle and/or also from remote objects onto the sensor pixel.

Monolithic signal processing and a storage medium (for example, EEPROM) housed monolithically on the chip are provided on each individual chip to store correction values for measured sensitivities, offset values, or the like and to provide them for a later accurate measurement of the object temperature and corresponding error and ambient temperature drift corrections inside or outside the chip.

The essential features of the invention consist of a surface-mountable SMD-enabled infrared sensor on a monolithic integrated sensor chip, which is housed in a housing, consisting of at least partially nonmetallic housing base and a housing cover, for example, in the form of a metallic deep-drawn part, and, provided with a gas or gas mixture, is hermetically sealed.

The monolithic sensor chip is located on the housing substrate (bottom plate) and is hermetically sealed by the housing cover, wherein an opening is located in the housing cover, which is closed using an imaging lens, which images the radiation of objects on the sensor pixel or pixels.

The gas or gas mixture located in the hermetically sealed housing is to have a thermal conductivity which is significantly less than that of air or nitrogen at normal pressure.

Furthermore, the size of the sensor elements which see through the lens is less than 500 µm, but preferably less than 300 µm.

The dimensions of the housing, consisting of housing substrate and housing cover, are to be at most 5 mm, but preferably less than 3 mm in length and width.

Furthermore, the thickness of the housing substrate, i.e., the bottom plate, is to be less than 0.5 mm, preferably less than 0.3 mm.

Finally, the miniaturized focusing lens is produced in a mass production method (for example, on silicon wafers) having a focal length of at most 1.9 mm, but preferably of at most 0.5 mm.

One particular version of the thermopile infrared sensor according to the invention is that a further sensor pixel is located for compensation purposes at the other end of the sensor chip, which does not look through the lens, but rather preferably at the metallic housing cover located above it.

To also enable gesture recognition or be able to recognize a temperature distribution, multiple sensor pixels are arranged in a horizontal multiple arrangement, for example, like a matrix, on the sensor chip.

The invention is explained in greater detail hereafter on the basis of exemplary embodiments. In the associated figures of the drawings:

DETAILED DESCRIPTION

Figure 1:
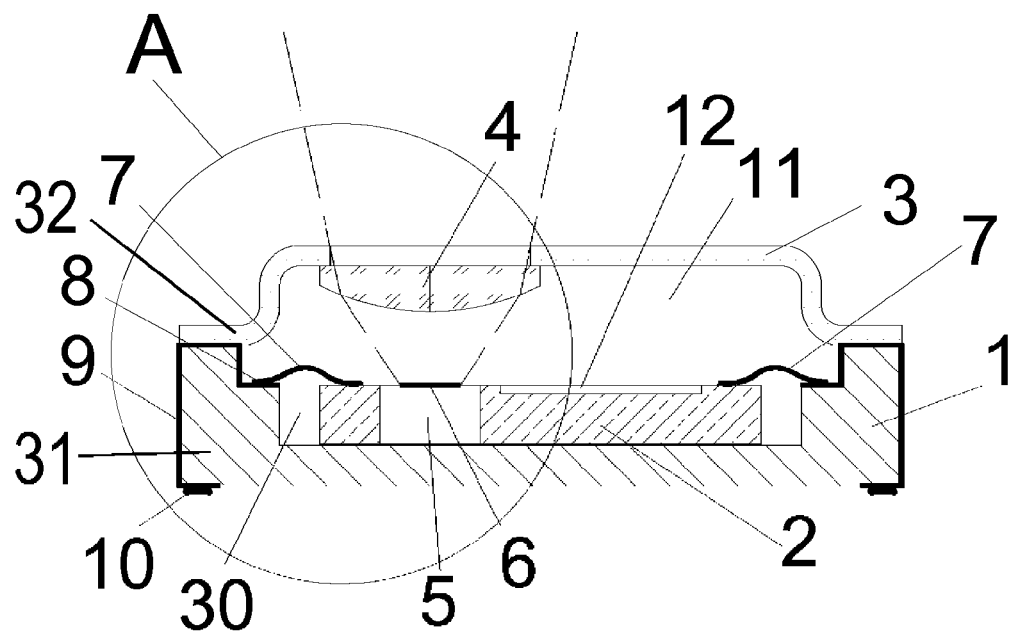
FIG. 1: shows the basic structure of a single-element thermopile infrared sensor according to the invention as a sectional illustration in an SMD housing having single-chip, installed lens optical unit, and monolithic integrated signal processing.
Figure 1A:
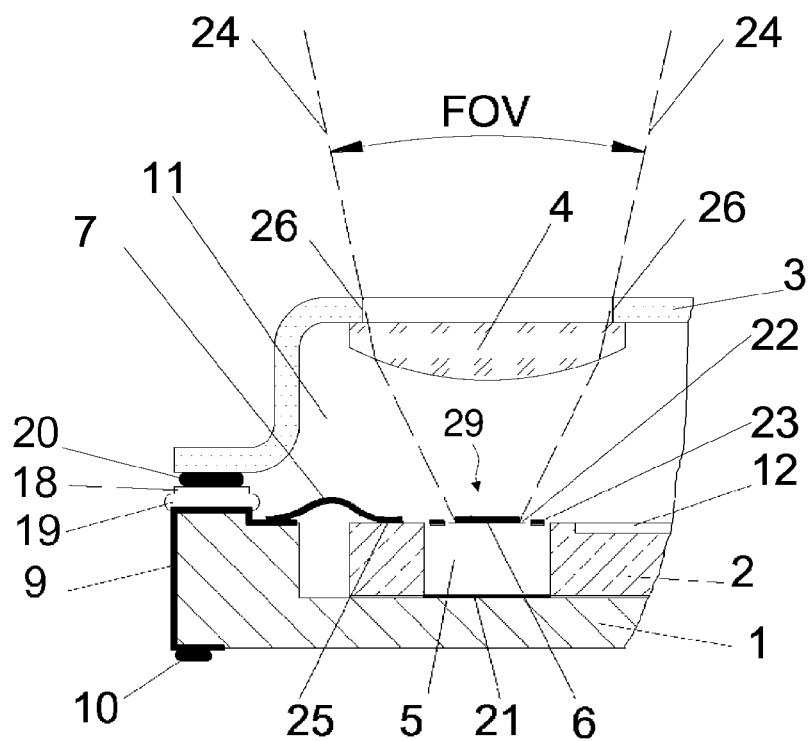
FIG. 1a: shows a detail A from FIG. 1 with highlighting of several details.
Figure 1B:
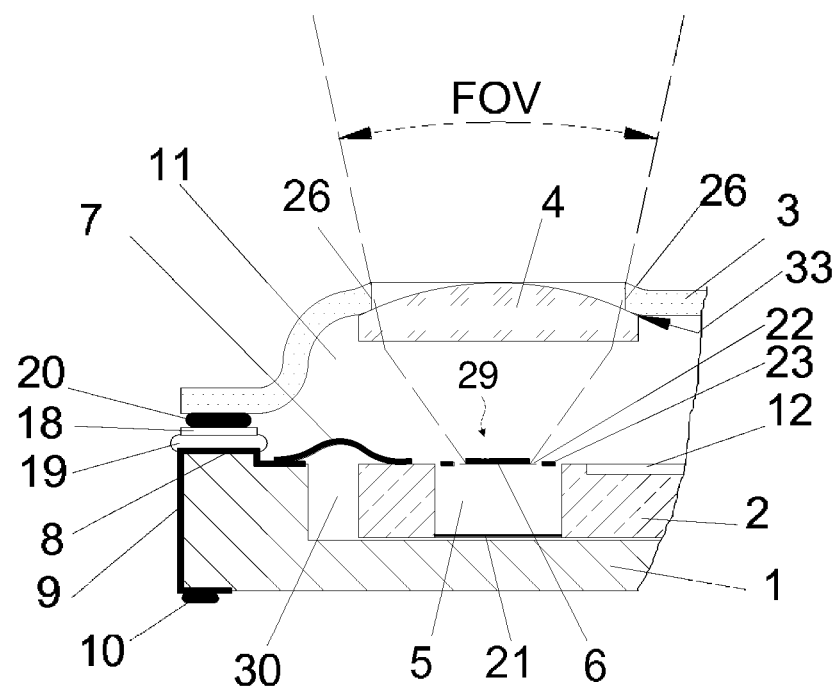
FIG. 1b: shows a modification of the miniaturized SMD sensor with particularly low structural height.

FIGS. 1 and 1a show the schematic structure of an SMD-enabled miniaturized thermopile infrared sensor according to the invention, in which a monolithic sensor chip 2 is arranged in a sensor housing, which consists of a bottom plate/housing substrate 1 provided with a recess 30 and side walls 31, and a housing cover 3. The housing substrate 1 consists of an insulator, such as ceramic. The sensor chip 2 is provided with a membrane 6 (sensor pixel) and an absorber layer for infrared radiation located thereon, under which a cavity 5 having vertical walls is located, i.e., the sensor chip encloses the cavity like a frame, which is also used as a heat sink for the thermopile, as will be described. The membrane 6 is suspended with the aid of beams 23 above the cavity 5, wherein the beams 23 connect the membrane 6 to the sensor chip 2. Slots are located between the beams 23 and the membrane 6 and/or the sensor chip 2 for thermal insulation. The cavity 5 simultaneously delimits the area of the pixel 29 (FIG. 1b). In addition to the membrane 6, a signal processing unit 12 is located on the sensor chip 2.

On each of the sides of the bottom plate 1, metallic connections 9 from the front side to the rear side of the bottom plate 1 (FIG. 1) are located laterally to the sensor chip 2. The metallic connection 9 ends on the inner side of the bottom substrate 1 in a contact surface 8 on the inner side of the side wall 31 in the form of a metallization as a connecting surface for a bond wire 7 for the electrical connection of a contact pad 25 on the sensor chip 2 and the contact surface 8 on the bottom substrate 1 (FIG. 1a). The metallic connections 9 each end in a contact surface 10 for the surface mounting, for example, on a circuit board or a substrate, on the rear side of the housing substrate 1, i.e., on the bottom in the drawing. In FIG. 1, a metallic connection 9 having a bond wire 7 is illustrated on each of the right and the left sides as representative of further adjacent metallic connections 9, which extend into the depth of the image.

The housing substrate 1 is covered by a housing cover 3, the lateral edge 32 of which, which is angled outward, is supported hermetically sealed on the side wall 31 of the housing substrate 1 (FIG. 1). A gas or gas medium 11 having special properties which are still to be described is located in the interior, i.e., between the housing cover 3 and the housing substrate 1.

Figure 3:
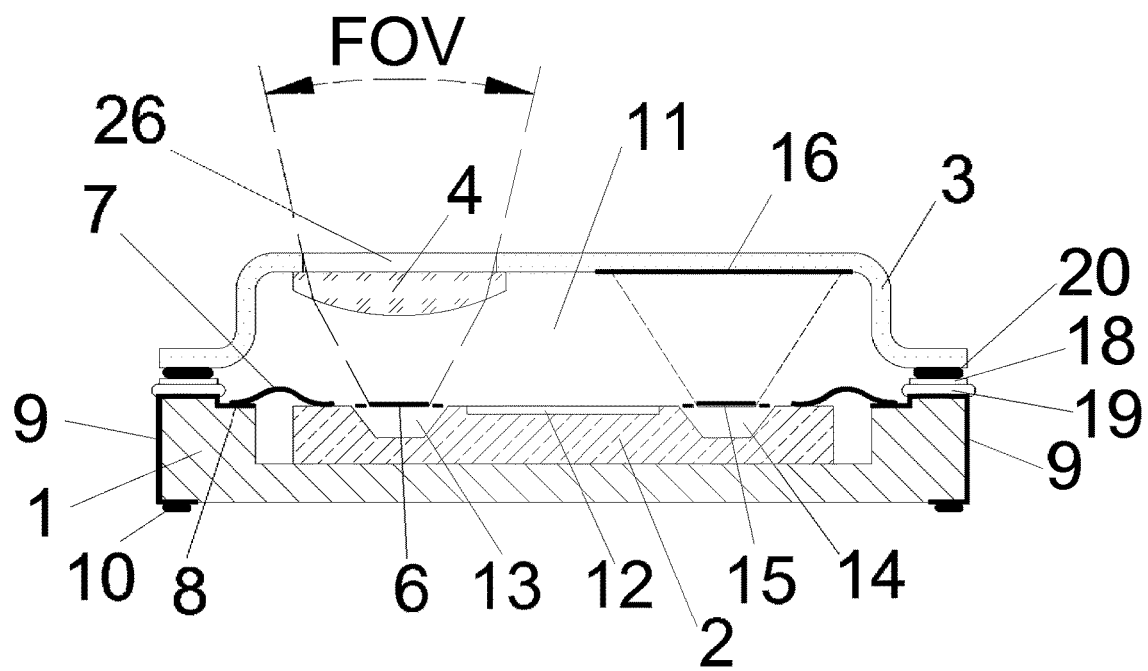
FIG. 3: shows a design of the SMD sensor according to the invention having an additional reference pixel for compensation purposes.

Furthermore, an aperture opening 26, in front of which a focusing lens 4 is arranged on the inner side of the housing cover 3 (FIG. 1a), is located in the housing cover 3. Alternatively, the lens 4 can also be mounted from the outside on the housing cover 3, as shown in FIG. 3b. It is essential to the function that the center axis of the aperture opening 26 and/or the focusing lens 3 corresponds to the axis of symmetry of the membrane 6. The lens 4 focuses the infrared radiation of a measured object located in front of the aperture opening 26 from a viewing angle ("field of view") FOV 24 on the sensor pixel having the absorber surface on the membrane 6 and/or the thin carrier membrane 22 of the pixel.

The housing cover 3 is a metallic deep-drawn part to ensure good thermal conductivity, which is adhesively bonded, soldered, or welded onto a contact point 18 of the housing substrate 1. Alternatively, the housing cover 3 can also be a metallic or nonmetallic injection-molded or diecast part, which preferably has good thermal conductivity and has prepared coatings for a hermetic adhesive, soldered, or welded closure in relation to the lateral edge 31 of the housing substrate 1 at the contact points to the housing substrate 1.

In the case of soldering or welding, the metallic contact point 18, which can be welded or soldered, has to be applied to the housing substrate 1 above an insulation layer 19 on the metallic connection 9 (FIG. 1a) to prevent a short circuit between the metal conductor tracks 9 on the side wall 31 of the housing substrate 1. The required hermetic housing closure is ensured with the aid of a peripheral soldered or adhesive joint 20.

The housing substrate 1, which comprises a central planar bottom plate having side walls 31 enclosing it, predominantly consists of a nonmetallic material (for example, ceramic), onto which metallic conductor tracks 9 are applied. These conductor tracks 9 end on the upper side with inner contact pads 8 and on the lower side with outer contact surfaces 10 for surface mounting. The contact surfaces 10 contain a coating, which can be soldered or welded, for the mechanical and electrical mounting on circuit boards or other circuitry carriers (not shown) located underneath.

The housing substrate 1 can be provided (FIG. 1a) on the upper side below the sensor pixel, i.e., in the recess 30, with a reflective metal layer 21 (for example, gold, silver, aluminum), to enhance the signal sensitivity of the sensor pixel by reflection of transmitted radiation components.

The absorber surface on the membrane 6 covers the so-called "hot" contacts of the thermopile sensor, which are arranged on the thin membrane 22, which consists, for example, of silicon oxide or silicon nitride, or of other insulating materials. The membrane having the absorber layer 6 is suspended above the recess 5 in the monolithic sensor chip 2 (silicon substrate). In the solution according to FIG. 1, the recess 5 has vertical or nearly vertical walls and is driven into the sensor chip 2 from the wafer rear side, for example, by reactive ion etching (a so-called RIE process). Alternatively, the cavity below the sensor pixel can also (as shown in FIG. 3) be driven from the front side into the sensor chip 2 (silicon wafer). In this case, instead of the reactive ion etching, a wet-chemical etching method known per se is used, in which a sacrificial layer (for example, porous silicon) or parts of the silicon substrate are dissolved and etched through slots known per se between the membrane 6 and the beams 23, and/or the beams 23 and the side wall of the recess 5. The inclined walls 13, 14 of the recesses 5 in FIG. 3 are an example of this.

The thermocouples of the thermopile structure are produced from thermoelectric materials known per se of differing thermoelectric polarity. These can be semiconductor materials applied in a CMOS process, for example, n-conductive and p-conductive polysilicon, (doped) amorphous silicon, germanium, or a mixed form of silicon and germanium, or also applied thin thermoelectric metal layers (for example, bismuth, antimony, inter alia), and have a thickness of less than 1 µm.

While the "hot" contacts of the thermocouples are located on the thin membrane 22 below the absorber layer, the "cold" contacts are arranged on the edge of the silicon substrate 2, so that the greatest possible temperature difference is achieved between both contacts. The small pixels particularly preferably have long beams 23 known per se, which are insulated from the silicon substrate of the sensor chip 2 and from the absorber region by slots etched from the front side into the membrane. Since such high-sensitivity thermopile pixels are sufficiently known from the prior art, further details (such as the embodiment of the beams and the insulating slots) are not shown in the figures of the drawings.

The signal processing unit 12 integrated in the sensor chip 2 contains, for example, temperature and voltage references, signal amplifiers, possibly low-pass filters, analog-to-digital converters, a microprocessor unit having data memory (for example, EEPROM), which are known per se, and an interface for communication with the external electronics of the mobile device (for example, smart phone). The temperature reference circuit integrated on the sensor chip 2 (for example, a so-called PTAT-(Proportional To Ambient Temperature)) measures the temperature of the sensor chip and thus of the "cold" contacts.

The preamplifiers contained in the signal processing unit 12 amplify the very low signal voltages of the thermopile sensor pixel or pixels and compare them to the voltage and ambient temperature references. All of these analog signals are converted in the analog-to-digital converter into digital values, which are in turn used in the microprocessor unit together with the correction values stored in the data memory (for example, EEPROM) for the object temperature computation.

The lens optical unit/focusing lens 4 mounted in the housing cover 3 has focusing lens surfaces on the lower side, the upper side, or on both sides. The mounting typically takes place in such a way that the distance to the sensor pixel corresponds precisely to the focal length (and/or the so-called "back focal length") of the lens 4. The lens is produced in a mass production method known per se (for example, pressing, molding) or particularly preferably in a wafer-level method, for example, on silicon wafers, in which many thousand lenses are produced simultaneously on a wafer and are provided with infrared filter layers. Such wafer lenses have the additional advantage that they may be "picked off" from the silicon wafer and mounted using the same automated handling system (so-called pick & place or die bonder) as normal semiconductor chips during the mounting of the lenses in the housing cover 3. In this case, both refractive lenses (having typical spheric or aspheric curvature of the active surface) and also diffractive lenses (for example, Fresnel lenses) can be used.

The mounting of the lens 4 in the housing cover 3 can be performed, for example, by adhesive bonding, soldering, or welding, wherein the edge of the lens receives a metallization layer (not shown) for the soldering or welding. The mounting of lens 4 and housing substrate 1 to the cover 3 is usually carried out by adhesive bonding if the gas or gas mixture to be enclosed is to have atmospheric normal pressure. If the pressure of the gas medium 11 in the housing is to be significantly lower than normal pressure, a soldering or welding method is preferably used for the mounting.

The viewing angle of a sensor pixel is ideally to be <40°, preferably <15° for the application. A formula which sets the pixel size in a ratio to the focal length may be used most simply to estimate the viewing angle FOV 24. The ARCTAN of the ratio of half the pixel size to focal length thus supplies half the viewing angle (FOV/2) as a result. It results therefrom, for example, that at a focal length of the lens of 1 mm and a pixel size of 0.5 mm, a viewing angle of 30° results. A pixel size of 0.26 mm supplies a viewing angle of approximately 12°. At greater focal length of the lens, the viewing angle is reduced, but at a lens focal length of 1.5 mm and the typical thicknesses of lens (for example, 0.26 mm), sensor chip (0.4 mm), cover and bottom plate (each 0.2 mm), housing heights of 2.6-3 mm already result depending on the construction of the lens—too much for most smart phones.

FIG. 1b shows a modification of the miniaturized SMD sensor having particularly low structural height. In this case, the housing cover 3 receives a bulge 33 upward, which approximately corresponds to the lens curvature. The curved (convex) side of the focusing lens 4 faces upward, so that the vertex of the lens 4 approximately corresponds to the maximum height of the cover 3 and thus defines the total housing height. In this manner, the total height of the housing can be reduced by approximately the thickness of the cover in comparison to the arrangement according to FIG. 1a.

Alternatively, the housing cover 3 can also have an additional elevation 28, which merges into an indentation 34 to accommodate the lens 4 and encloses its outer circumference. The lens 4 is inserted with the curved side downward into the indentation 34 in this case (FIG. 3b). The aperture opening 26 forms the inner edge of the indentation 34 here, which also supports the focusing lens 4.

The medium 11 enclosed in the housing is a gas or gas mixture, the thermal conductivity of which is substantially lower than air or nitrogen at normal pressure. The gas medium 11 is preferably a gas having high molar mass (for example, xenon, krypton, or argon) or a gas having an internal pressure significantly reduced in relation to normal pressure. The housing has to be sealed in such a way that no gas exchange takes place with the surroundings.

Figure 2:
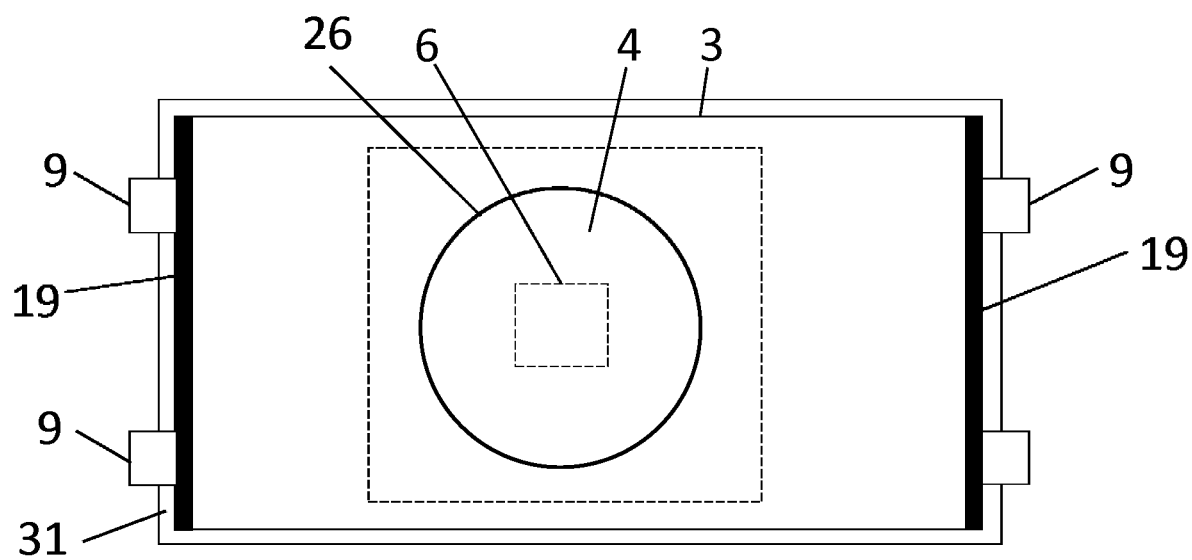
FIG. 2: shows the top view of a single-element thermopile infrared sensor according to the invention in an SMD housing.

FIG. 2 shows a top view of a surface-mountable IR single element sensor according to the invention as shown in FIG. 1 with further details.

The lens 4 is located here precisely symmetrically above the sensor pixel 6, wherein multiple terminal contacts 9 establish an electrical connection from the sensor chip 2 in the interior of the housing to the terminal contacts 10 for the SMD mounting on the housing lower side.

FIG. 3 shows a further design of the SMD thermopile sensor according to the invention, which can be miniaturized, and in which, adjacent to the active sensor pixel 6, a further pixel is provided as a reference pixel 15, which is arranged at the remote end of the sensor chip 2. This reference pixel 15 does not receive infrared radiation from the measured object itself, but rather "looks" toward an emitting surface 16, which is applied or mounted on the inner side of the cover. The compensation of measurement errors due to temperature gradients in the sensor housing, induced, for example, by the so-called "heat shock" effect, is thus possible. This emitting layer 16 is preferably produced by printing or spraying and/or vapor deposition via changing masks. Alternatively, an additional part having high emission can be adhesively bonded on the cover inner surface or mounted in another manner having good thermal contact in relation to the housing cover 3.

In the embodiment in FIG. 3, the thermopile pixels are produced in surface micromechanics, i.e., by etching free the cavities 5 below the membranes 6 and 15 from the front side through slots in the freestanding membranes. Both pixels 6, 15 can also, however, like the sensor pixels according to FIG. 1 or FIG. 3a, have a cavity having vertical walls 5, which have been driven from the rear side by DRIE into the sensor chip 2.

Figure 3A:
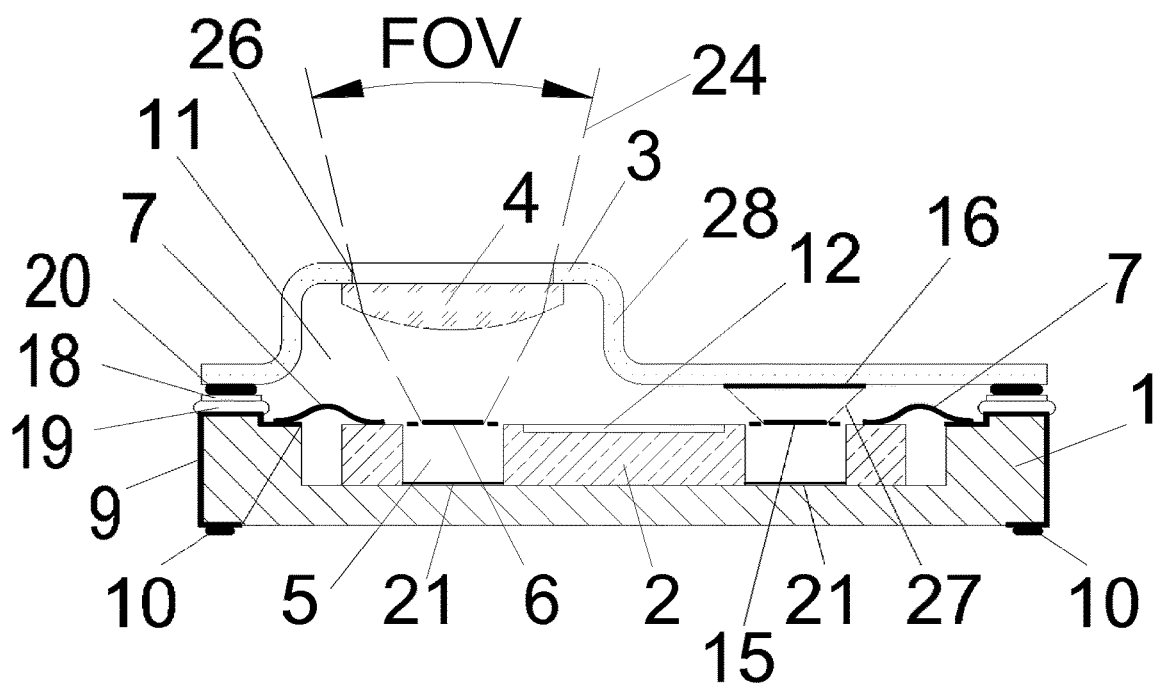
FIG. 3a: shows a design of the miniaturized SMD sensor having a reference pixel having different cover height above the signal pixel and the reference pixel.
Figure 3B:
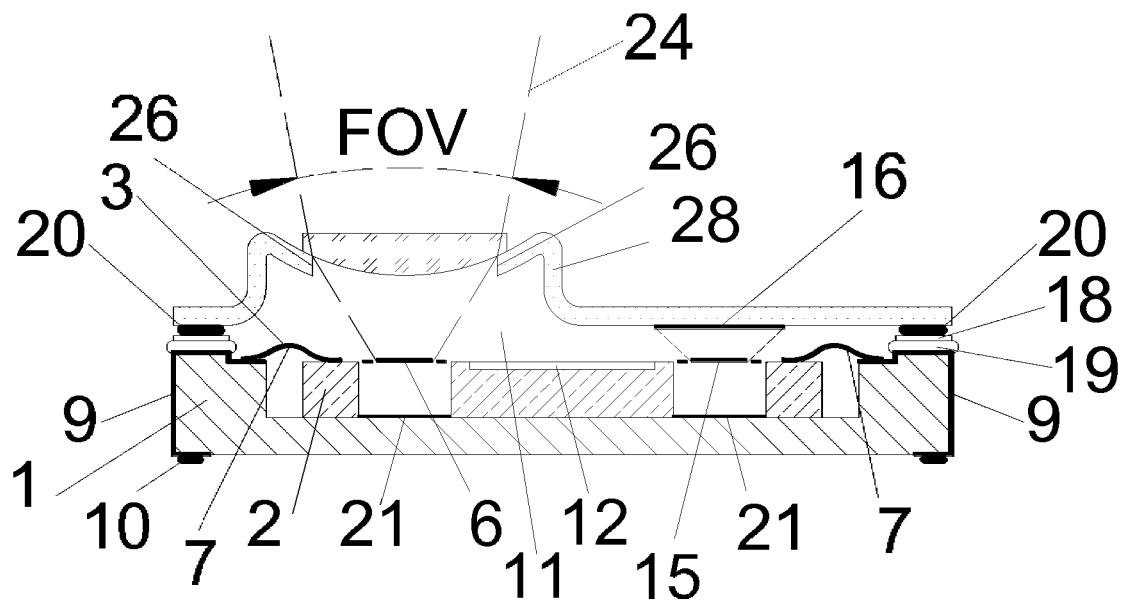
FIG. 3b: shows a further design of the miniaturized SMD sensor having a lens mounted from the outside on the housing cover.

FIG. 3a shows a further design according to the invention of the miniaturized SMD sensor having a reference pixel 15. In this arrangement, the housing cover for the lens has an additional elevation 28, to achieve the distance (so-called "back focal length") necessary for sharp imaging between the lens 4 and the absorber 6 on the membrane, while the cover 3 having the absorbing layer 16 above the reference pixel is embodied particularly flat. The reference pixel having the absorber 15 may thus be moved closer to the sensor pixel having the absorber 6 in an effective manner, and nonetheless the reference pixel does not receive radiation of the object via the lens. The special elevation 28 can also be designed in a formfitting manner so that the lens 4 is mounted precisely symmetrically above the absorber 6 of the sensor pixel during the mounting to avoid optical imaging errors, such as "squinting", if the optical axis of the lens is located precisely vertically above the absorber center point.

Figure 4:
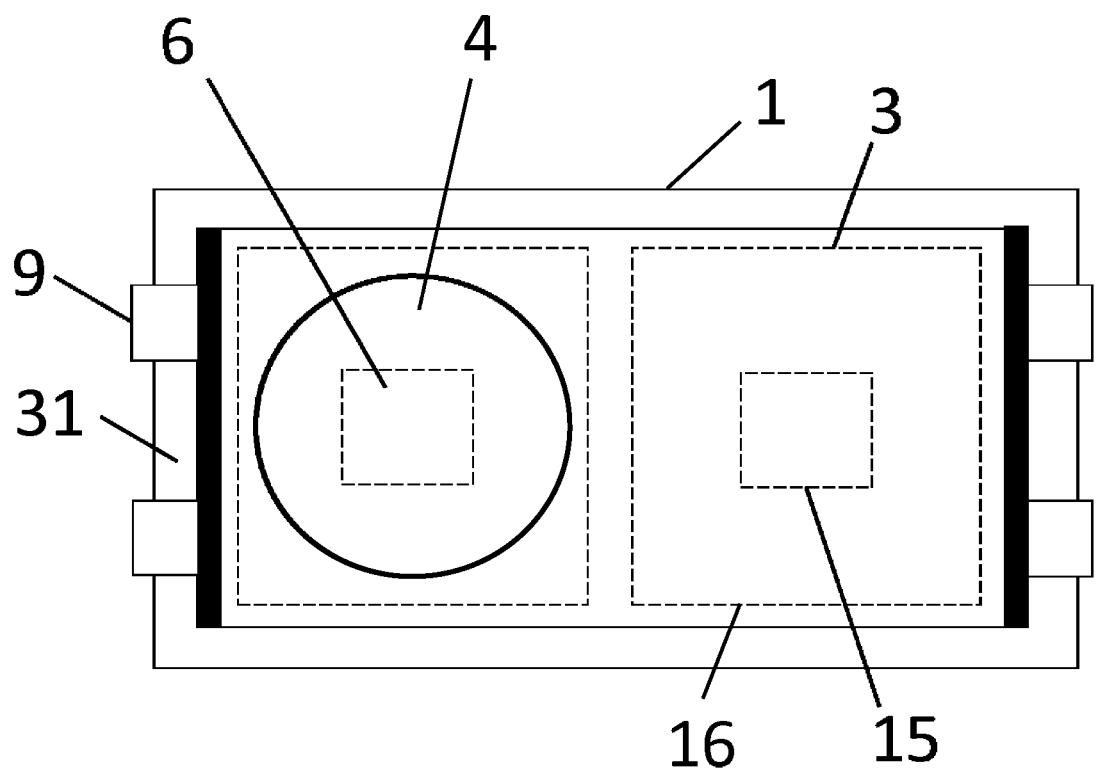
FIG. 4: shows the top view of the thermopile infrared sensor in the SMD housing having reference pixel.

FIG. 4 shows the top view of a design according to the invention of the miniaturized SMD sensor according to FIGS. 3 and 3a. It can be seen therefrom that the active sensor pixel 6 looks outward through the lens optical unit 4 of the aperture opening, while the reference pixel 15, in contrast, looks at the absorbing layer 16 located behind the cover and measures the housing temperature at the same time. In principle, depending on the space requirement in the terminal, square or approximately square housing shapes may also be achieved. It is possible more easily to construct the entire housing approximately square using the design in FIG. 3a, because the distance between the absorbers 6 and 16 may be significantly reduced.

Using the additional reference pixel 15, for compensation purposes of slow and fast ambient temperature changes, both the chip temperature and thus the temperature of the "cold" thermopile contacts are available by means of integrated PTAT reference, and also the housing temperature of the cover 3 having the absorber layer 16. This enables an effective compensation of the short-term temperature changes occurring in mobile devices (for example, smart phones), for example, after the switching on, when "taking out of the trouser pocket", when holding to the face or ear, or when changing from the temperature-controlled interior to the outside, where significantly higher or lower temperature changes can suddenly occur.

The design of the active pixel as a multiple pixel represents an expansion of the invention which is of great interest for mobile devices. A corresponding solution is apparent from FIG. 5. In this case, instead of a single pixel, multiple pixels 17 (for example, 2×2, 4×4, 8×8, 16×16) are arranged below the lens, to capture a spatial distribution of the temperature distribution of the object or also the easy recognition of gestures. The cavities under the pixels can again be driven into the sensor chip 2 from the upper side or the lower side using the slotted membranes.

Figure 5:
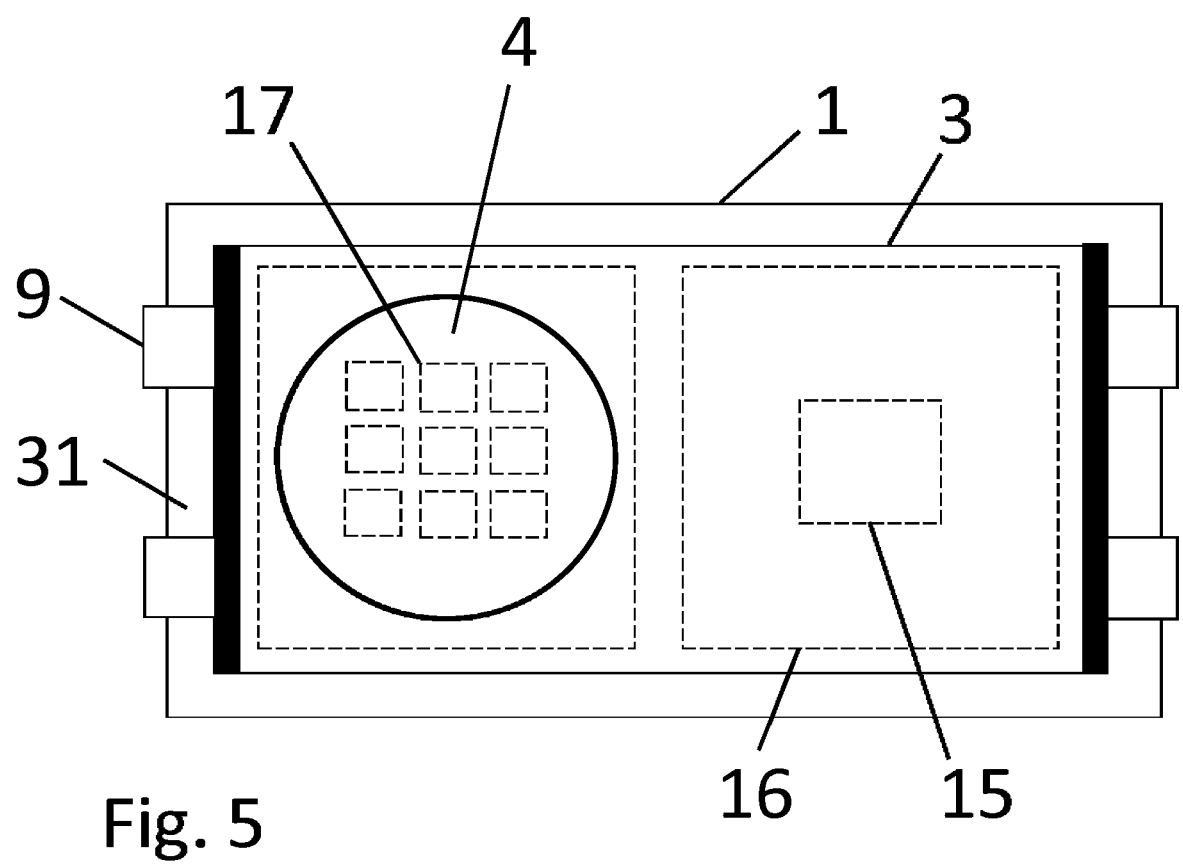
FIG. 5: shows a further embodiment according to the invention of the SMD thermopile infrared sensor having multiple sensor pixels and monolithic integrated signal processing.

The sensor chip 2 according to the invention as shown in FIG. 5 contains multiple individual cells 17 having slotted membrane and beam structure known per se, on which the thermocouples (not shown in detail) are housed.

The signal processing of the individual pixels takes place in the signal processing unit 12, at the output (interface) of which items of digital signal information of the individual pixels are output together with the correction values for measuring the temperature distribution or, for example, a gesture controller. The lens optical unit is designed so that the remote measured objects are sharply imaged on the sensor pixels.

LIST OF REFERENCE NUMERALS 1 housing substrate (bottom plate)
2 monolithic sensor chip
3 housing cover
4 focusing lens
5 cavity under pixel
6 membrane having absorber layer
7 bond wire
8 contact surface (metallization) on housing substrate
9 metallic connection
10 contact surface on housing rear side
11 gas medium in hermetically sealed housing
12 signal processing unit
13 cavity under active pixel
14 cavity under reference pixel
15 membrane having absorber layer of the reference pixel
16 absorbing layer
17 sensor pixels in matrix form
18 metallized bonding surface, which can be soldered, on housing substrate
19 insulation layer
20 soldered or adhesive joint
21 reflective metal layer
22 thin carrier membrane of the pixel
23 beam
24 outer beam path
25 terminal contact
26 aperture opening
27 viewing angle of the reference pixel
28 elevation of the housing cover above sensor pixel
29 thermopile pixel
30 recess
31 side wall
32 lateral edge
33 bulge
34 indentation

The invention claimed is:

1. An SMD-enabled thermopile infrared sensor for contactless temperature measurement, as a hotspot, or for gesture detection,
having at least one thermopile pixel on a monolithic integrated sensor chip, which is arranged in a hermetically sealed housing, the housing comprising an at least partially nonmetallic housing substrate and a housing cover,
wherein a gas or gas mixture is located in the housing,
wherein an aperture opening (26) is introduced into the housing cover (3) opposite to the at least one thermopile pixel (29), which opening is closed using a focusing lens (4), which focuses radiation of objects onto the at least one thermopile pixel (29) on the housing substrate (1),
wherein the housing substrate (1) is an insulator, and is provided with a recess (30) and side walls (31) for accommodating the sensor chip (2),
wherein the housing cover (3) has angled lateral edges (32), which are supported and hermetically sealed on the side walls (31) of the housing substrate (1),
wherein the housing substrate (1) has metallic connections (9) extending from a front side of the housing substrate to a rear side of the housing substrate, the metallic connections being provided on the rear side of the housing substrate (1) with contact surfaces (10) for a surface mounting,
wherein a signal processing unit (12) is integrated on the sensor chip (2) adjacent to the at least one thermopile pixel (29), and
wherein an overall height of the housing is at most 3 mm.

2. The SMD-enabled thermopile infrared sensor as in claim 1,
wherein the focusing lens (4) images object radiation on the at least one thermopile pixel (29) from a viewing angle of at most 40°.

3. The SMD-enabled thermopile infrared sensor as in claim 1,
wherein the housing cover (3) consists of a metal or nonmetal having high thermal conductivity and is a deep-drawn, injection-molded, or diecast part.

4. The SMD-enabled thermopile infrared sensor as in claim 1,
wherein the housing cover (3) and the housing substrate (1) are bonded to one another by an adhesive, are soldered to one another, or are welded to one another, and
wherein an insulation layer (19) is located above the metallic connections (9) and
wherein a metal layer (18) is located thereon.

5. The SMD-enabled thermopile infrared sensor as in claim 1,
wherein a reference pixel (15), which receives infrared radiation from the housing cover (3) located above it, is arranged in the sensor chip (2) adjacent to the at least one thermopile pixel (29) arranged below the focusing lens (4), and
wherein the housing cover (3) has an absorbing layer (18) or another type of cover on an inner side in a region above the reference pixel (15).

6. The SMD-enabled thermopile infrared sensor as claimed in claim 5,
wherein a distance of the housing cover (3) in a region of the focusing lens (4) from the at least one thermopile pixel (29) is significantly greater than a distance in a region of the absorbing layer (18) from the reference pixel (15).

7. The SMD-enabled thermopile infrared sensor as in claim 1,
wherein the housing cover (3) has, in a region of the focusing lens (4) on an inner side, a bulge (33) formed according to an outer shape of the focusing lens (4) or an indentation (34) adjoining an elevation (28) of the housing cover (3) for fixing the focusing lens (4) in its position above the at least one thermopile pixel (29).

8. The SMD-enabled thermopile infrared sensor as in claim 1, wherein the least one thermopile pixel comprises multiple sensor pixels (17) that are arranged in matrix form under the focusing lens (4).

9. The SMD-enabled thermopile infrared sensor as in claim 8,
wherein a size of the at least one thermopile pixel (29) is at most 500 μm.

10. The SMD-enabled thermopile infrared sensor as in claim 8,
wherein the signal processing unit (12)
comprises a storage of calibration data for the sensor pixels (17)
is configured to compute an object temperature, and
is configured to store measured values.

11. The SMD-enabled thermopile infrared sensor as in claim 1,
wherein a length or a width of the housing substrate (1) is at most 5 mm.

12. The SMD-enabled thermopile infrared sensor as in claim 1,
wherein the focusing lens (4) is diffractive or refractive and has either aspheric or spheric surfaces.

13. The SMD-enabled thermopile infrared sensor as in claim 1,
wherein the focusing lens has a focal length between 0.5 mm and 1.9 mm.

14. The SMD-enabled thermopile infrared sensor as in claim 1,
wherein a thickness of a bottom surface of the housing substrate (1) and a thickness of the housing cover (3) are at most 0.5 mm.

15. The SMD-enabled thermopile infrared sensor as in claim 1,
wherein the signal processing unit (12) comprises
measuring units for temperature and voltage references and also an operating voltage and
furthermore contains signal amplifiers, low-pass filters, analog-to-digital converters, a microprocessor unit having data memory, and an interface for communication with external electronics of a mobile device.

* * * * *